United States Patent
Kurokawa

(10) Patent No.: US 10,358,544 B2
(45) Date of Patent: Jul. 23, 2019

(54) THERMOPLASTIC ELASTOMER COMPOSITION

(71) Applicant: Sumitomo Chemical Company, Limited, Tokyo (JP)

(72) Inventor: Ryosuke Kurokawa, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 15/045,779

(22) Filed: Feb. 17, 2016

(65) Prior Publication Data

US 2016/0244600 A1    Aug. 25, 2016

(30) Foreign Application Priority Data

Feb. 19, 2015 (JP) ................. 2015-030286

(51) Int. Cl.
| | | |
|---|---|---|
| C08L 23/08 | (2006.01) | |
| C08K 3/18 | (2006.01) | |
| C08K 5/00 | (2006.01) | |
| C08K 5/49 | (2006.01) | |

(52) U.S. Cl.
CPC ............ C08L 23/0815 (2013.01); C08K 3/18 (2013.01); C08K 5/0066 (2013.01); C08K 5/49 (2013.01); C08L 23/0807 (2013.01); C08L 2201/02 (2013.01); C08L 2205/02 (2013.01); C08L 2205/03 (2013.01)

(58) Field of Classification Search
CPC .. C08L 23/0815; C08L 23/0807; C08L 23/14; C08L 2201/02; C08L 2205/03; C08K 5/0066
USPC .......................................................... 524/141
See application file for complete search history.

(56) References Cited

U.S. PATENT DOCUMENTS

| 2002/0086947 A1* | 7/2002 | Burkhardt | ............ | B01J 31/143 |
| | | | | 525/240 |
| 2004/0254270 A1* | 12/2004 | Harashina | ................ | C08K 3/24 |
| | | | | 524/86 |
| 2011/0217538 A1* | 9/2011 | Miura | ..................... | B32B 27/32 |
| | | | | 428/304.4 |
| 2014/0039108 A1 | 2/2014 | Kurokawa et al. | | |
| 2015/0183972 A1 | 7/2015 | Kurokawa et al. | | |
| 2015/0232651 A1* | 8/2015 | Gossi | ..................... | C08L 23/14 |
| | | | | 523/122 |

FOREIGN PATENT DOCUMENTS

| CN | 102304279 A | 1/2012 |
|---|---|---|
| JP | 2005060603 A | 3/2005 |
| JP | 2008063458 A | 3/2008 |
| JP | 2008208269 A | 9/2008 |
| JP | 2010222402 A | 10/2010 |
| JP | 2013515827 A | 5/2013 |
| JP | 2014043564 A | 3/2014 |
| JP | 2015124331 A | 7/2015 |
| WO | 2011079457 A1 | 7/2011 |

OTHER PUBLICATIONS

Extended European Search Report dated Apr. 14, 2016 in EP Application No. 16156025.5.

* cited by examiner

*Primary Examiner* — Doris L Lee
(74) *Attorney, Agent, or Firm* — Panitch Schwarze Belisario & Nadel LLP

(57) ABSTRACT

There is provided a thermoplastic elastomer composition from which a molded article excellent in flame retardancy, tensile properties, softness, and appearance can be obtained and by which a mold is hardly polluted during its molding. The thermoplastic elastomer composition includes at least one selected from an ethylene copolymer containing monomer units derived from ethylene and monomer units derived from at least one selected from propylene and α-olefins having 4 to 10 carbon atoms (component (A)) and a copolymer containing monomer units derived from an aromatic vinyl compound and monomer units derived from a conjugate diene compound (component (B)), a propylene polymer (component (C)), a phosphoric acid salt compound (component (D)), a phosphoric acid ester (component (E)), and a metal oxide (component (F)).

8 Claims, No Drawings

THERMOPLASTIC ELASTOMER COMPOSITION

BACKGROUND OF THE INVENTION

Technical Field

The present invention relates to a thermoplastic elastomer composition from which a molded article excellent in flame retardancy, tensile properties, softness, and appearance can be obtained and by which a mold is hardly polluted during its molding.

Background Art

Thermoplastic elastomer compositions are used for automobile interior parts, automobile exterior parts, electrical machinery parts, household electric appliance parts, packaging members, materials for agriculture, members for building, etc. In recent years, aiming at applications to materials which are required to have flame retardancy, such as wire covering materials and electronic parts, thermoplastic elastomer compositions having flame retardancy are under development (patent documents 1 to 3).

RELATED ART DOCUMENTS

Patent Document 1: JP-A-2010-222402
Patent Document 2: JP-A-2005-60603
Patent Document 3: JP-A-2008-63458

SUMMARY OF THE INVENTION

Problems to be Solved by the Invention

However, the thermoplastic elastomer compositions disclosed in the patent documents are prone to pollute a mold during their molding. In addition, molded articles made of the thermoplastic elastomer compositions are not satisfactory in flame retardancy, tensile properties, softness, and appearance.

The object of the present invention is to provide a thermoplastic elastomer composition from which a molded article excellent in flame retardancy, tensile properties, softness, and appearance and by which a mold is hardly polluted during its molding, and a molded article thereof.

Means for Solving the Problems

The present invention relates to a thermoplastic elastomer composition comprising:
at least one selected from an ethylene copolymer comprising 50% by weight to 95% by weight of monomer units derived from ethylene and 5% by weight to 50% by weight of monomer units derived from at least one selected from the group consisting of propylene and α-olefins having 4 to 10 carbon atoms (component (A)), where the total amount of the monomer units derived from ethylene and the monomer units derived from at least one selected from the group consisting of propylene and α-olefins having 4 to 10 carbon atoms is taken as 100% by weight, and a copolymer comprising monomer units derived from an aromatic vinyl compound and monomer units derived from a conjugate diene compound (component (B)),
a propylene polymer comprising monomer units derived from propylene, wherein the content of the monomer units derived from propylene exceeds 50% by weight (component (C)), where the whole amount of the component (C) is taken as 100% by weight,
a phosphoric acid salt compound (component (D)),
a phosphoric acid ester (component (E)),
a metal oxide (component (F)),
wherein, based on 100 parts by weight in total of the component (A), the component (B) and the component (C),
the content of the component (D) is 35 parts by weight to 200 parts by weight,
the content of the component (E) is 0.1 parts by weight to 40 parts by weight,
the content of the component (F) is 0 parts by weight to 20 parts by weight,
the weight ratio of the total of the component (A) and the component (B) to the component (C) ((the weight of the component (A)+ the weight of the component (B))/the weight of the component (C)) is from 0.7 to 10, and
the weight ratio of the total of the component (D) and the component (F) to the component (E) ((the weight of the component (D)+ the weight of the component (F))/the weight of the component (E)) is from 5 to 70.

The present invention can provide a thermoplastic elastomer composition from which a molded article excellent in flame retardancy, tensile characteristics, softness, and appearance and by which a mold is hardly polluted during its molding, and a molded article thereof.

MODE FOR CARRYING OUT THE INVENTION

Ethylene Copolymer (Component (A))

The ethylene copolymer (hereinafter referred to as component (A)) is a copolymer comprising monomer units derived from ethylene and monomer units derived from at least one selected from the group consisting of propylene and α-olefins having 4 to 10 carbon atoms.

The α-olefin having 4 to 10 carbon atoms is preferably an α-olefin having 4 to 8 carbon atoms, examples of which include 1-butene, 2-methylpropylene, 1-pentene, 3-methyl-1-butene, 1-hexene, 4-methyl-1-pentene, and 1-octene. Such α-olefins having 4 to 10 carbon atoms may be used individually or alternatively may be used in combination.

The monomer unit derived from at least one selected from the group consisting of propylene and α-olefins having 4 to 10 carbon atoms is more preferably a monomer unit derived from propylene, a monomer unit derived from 1-butene, or a monomer unit derived from 1-octene.

The component (A) may have, in addition to the monomer units derived from ethylene and the monomer units derived from at least one selected from the group consisting of propylene and α-olefins having 4 to 10 carbon atoms, monomer units derived from a different monomer. Examples of such a different monomer include conjugated dienes having 4 to 8 carbon atoms such as 1,3-butadiene, 2-methyl-1,3-butadiene, 1,3-pentadiene, and 2,3-dimethyl-1,3-butadiene; non-conjugated dienes having 5 to 15 carbon atoms such as dicyclopentadiene, 5-ethylidene-2-norbornene, 1,4-hexadiene, 1,5-dicyclooctadiene, 7-methyl-1,6-octadiene, and 5-vinyl-2-norbornene; vinyl carboxylates such as vinyl acetate; unsaturated carboxylic acid esters, such as methyl acrylate, ethyl acrylate, butyl acrylate, methyl methacrylate, and ethyl methacrylate; and unsaturated carboxylic acids, such as acrylic acid and methacrylic acid. Such another monomer is preferably a non-conjugated diene having 5 to 15 carbon atoms, and more preferably is 5-ethylidene-2-norbornene or dicyclopentadiene. The component (A) may contain monomer units derived from two or more such different monomers.

The content of the monomer units derived from ethylene in the component (A) is 50% by weight to 95% by weight, preferably 53% by weight to 90% by weight, more preferably 55% by weight to 75% by weight. The content of the monomer units derived from at least one selected from the group consisting of propylene and α-olefins having 4 to 10 carbon atoms in the component (A) is 5% by weight to 50% by weight, preferably 10% by weight to 47% by weight, and more preferably 25% by weight to 45% by weight. The total amount of the monomer units derived from ethylene and the monomer units derived from at least one selected from the group consisting of propylene and α-olefins having 4 to 10 carbon atoms in the component (A) is taken as 100% by weight.

The content of the monomer units derived from ethylene and the content of the monomer units derived from at least one selected from the group consisting of propylene and α-olefins having 4 to 10 carbon atoms in the component (A) can be determined by infrared spectroscopy. Specifically, the infrared absorption spectrum of the component (A) is measured by using an infrared spectrophotometer, and then the content of the monomer units derived from ethylene and the content of the monomer units derived from at least one selected from the group consisting of propylene and α-olefins having 4 to 10 carbon atoms are determined in accordance with the method disclosed in "Characterization of Polyethylene by Infrared Absorption Spectrum" (Takayama, Usami, et al.) or "Die Makromolekulare Chemie, 177, 461 (1976)" (Mc Rae, M. A., Madam S, W. F. et al.).

When the component (A) comprises monomer units derived from a non-conjugated diene having 5 to 15 carbon atoms, the content of the monomer units derived from the non-conjugated diene having 5 to 15 carbon atoms of the component (A) is 10% by weight or less, preferably 5% by weight or less, where the overall amount of the monomer units contained in the component (A) is taken as 100% by weight. The content of the monomer units derived from a non-conjugated diene can be determined by infrared spectroscopy. Specifically, the peak intensity of a peak derived from the non-conjugated diene having 5 to 15 carbon atoms of the component (A) is measured by using an infrared spectrophotometer, and then the content of the monomer units derived from the non-conjugated diene having 5 to 15 carbon atoms in the component (A) is calculated from the peak intensity.

Examples of the component (A) include ethylene-propylene copolymers, ethylene-1-butene copolymers, ethylene-1-hexene copolymers, ethylene-1-octene copolymers, ethylene-propylene-1-butene copolymers, ethylene-propylene-1-hexene copolymers, ethylene-propylene-1-octene copolymers, ethylene-propylene-5-ethylidene-2-norbornene copolymers, ethylene-propylene-dicyclopentadiene copolymers, ethylene-propylene-1,4-hexadiene copolymers, and ethylene-propylene-5-vinyl-2-norbornene copolymers. The component (A) may be used singly or two or more thereof may be used in combination.

It is preferable to use, as the component (A), a mixture of the ethylene-α-olefin copolymer (component (A1)) defined below and the ethylene-α-olefin copolymer (component (A2)) defined below in order to render the thermoplastic elastomer composition less prone to pollute a mold during its molding and improve the tensile properties and the appearance of a molded article.

Ethylene copolymer (component (A1)): an ethylene copolymer wherein the content of monomer units derived from ethylene is 50% by weight to 65% by weight, and the content of monomer units derived from at least one selected from the group consisting of propylene and α-olefins having 4 to 10 carbon atoms is 35% by weight to 50% by weight, where the total amount of the monomer units derived from ethylene and the monomer units derived from at least one selected from the group consisting of propylene and α-olefins having 4 to 10 carbon atoms in the component (A1) is taken as 100% by weight.

Ethylene copolymer (component (A2)): an ethylene copolymer wherein the content of monomer units derived from ethylene is more than 65% by weight and not more than 95% by weight, and the content of monomer units derived from at least one selected from the group consisting of propylene and α-olefins having 4 to 10 carbon atoms is not less than 5% by weight but less than 35% by weight, where the total amount of the monomer units derived from ethylene and the monomer units derived from at least one selected from the group consisting of propylene and α-olefins having 4 to 10 carbon atoms in the component (A2) is taken as 100% by weight.

In order to make the appearance of a molded article good, the weight ratio of the component (A1) to the component (A2) (the weight of the component (A1)/the weight of the component (A2)) is preferably from 0.1 to 10, more preferably from 0.2 to 5, even more preferably from 0.3 to 3.

The Mooney viscosity measured at 121° C. ($ML_{1+4}121°$ C.) of the component (A) is preferably 5 to 150, more preferably 10 to 75, even more preferably 20 to 60 in order to render the thermoplastic elastomer composition less prone to pollute a mold during its molding and improve the tensile properties, flame retardancy, and the appearance of a molded article. The Mooney viscosity is measured in accordance with ASTM D-1646, and ($ML_{1+4}121°$ C.) expresses the following meanings:

M: Mooney viscosity,
L: a large rotor was used,
121° C.: measurement temperature,
1+4: a value measured when a rotor was rotated at 2 rpm for 4 minutes after the sample was heated for 1 minute.

When a mixture of the component (A1) and the component (A2) is used as the component (A), the Mooney viscosity measured at 121° C. ($ML_{1+4}121°$ C.) of each of the component (A1) and the component (A2) is preferably 5 to 150, more preferably 10 to 75, even more preferably 20 to 60 in order to render the thermoplastic elastomer composition less prone to pollute a mold during its molding and improve the tensile properties, flame retardancy, and the appearance of a molded article. The Mooney viscosity is measured in accordance with ASTM D-1646.

In order to make the tensile properties of a molded article good, the density of the component (A) is preferably 0.850 g/m$^3$ to 0.910 g/m$^3$, more preferably 0.855 g/cm$^3$ to 0.900 g/cm$^3$, even more preferably 0.860 g/cm$^3$ to 0.880 g/cm$^3$. The density is measured without annealing by the method specified in JIS K6760-1981.

The molecular weight distribution of the component (A) is preferably 1.5 to 3.0, more preferably 1.5 to 2.5, even more preferably 1.5 to 2.3.

The molecular weight distribution of the component (A) is a ratio of a weight average molecular weight (Mw) to a number average molecular weight (Mn), both measured by gel permeation chromatography, i.e., Mw/Mn.

The method for producing the component (A) may be a conventional polymerization method using a conventional polymerization catalyst. Examples of such a method include a slurry polymerization method, a solution polymerization method, a bulk polymerization method, a gas phase polymerization method, etc. using a Ziegler-Natta catalyst or a complex-based catalyst known in the art such as a metallocene complex and a non-metallocene complex.

Copolymer Comprising Monomer Units Derived from an Aromatic Vinyl Compound and Monomer Units Derived from a Conjugate Diene Compound (Component (B))

Examples of the copolymer comprising monomer units derived from an aromatic vinyl compound and monomer units derived from a conjugate diene compound (hereinafter referred to as "component (B)") include aromatic vinyl compound-conjugate diene compound polymers, aromatic vinyl compound-conjugate diene compound-aromatic vinyl compound polymers, and these hydrogenated products thereof.

Examples of the aromatic vinyl compound in the component (B) include styrene, α-methylstyrene, o-, m-, or p-methylstyrene, 1,3-dimethylstyrene, vinylxylene, monochlorostyrene, dichlorostyrene, monobromostyrene, dibromostyrene, ethylstyrene, and vinylnaphthalene, and styrene is preferred.

Examples of the conjugated diene compound in the component (B) include butadiene, isoprene, 2,3-dimethyl-1,3-butadiene, 2-neopentyl-1,3-butadiene, 2-chloro-1,3-butadiene, and 2-cyano-1,3-butadiene, and butadiene or isoprene is preferred.

The content of the monomer units derived from the aromatic vinyl compound is 10% by weight to 50% by weight, preferably 15% by weight to 45% by weight, and more preferably 20% by weight to 40% by weight in order to render the thermoplastic elastomer composition less prone to pollute a mold during its molding and improve the tensile properties and the appearance of a molded article. The whole amount of the copolymer comprising monomer units derived from an aromatic vinyl compound and monomer units derived from a conjugate diene compound is taken as 100% by weight. The content of the monomer units derived from the aromatic vinyl compound can be determined by $^1$H-NMR measurement.

The content of the monomer units derived from a conjugate diene compound is preferably 50% by weight to 90% by weight, more preferably 55% by weight to 85% by weight, even more preferably 60% by weight to 80% by weight. The whole amount of the copolymer comprising monomer units derived from an aromatic vinyl compound and monomer units derived from a conjugate diene compound is taken as 100% by weight. The content of the monomer units derived from the conjugate diene compound can be determined by $^1$H-NMR measurement.

The hydrogenation rate of the hydrogenated product of the component (B) is preferably 80% or more, more preferably 90% or more where the amount of the double bonds of the monomer units derived from the conjugated diene compound in the copolymer before hydrogenation is taken as 100%.

As the copolymer comprising monomer units derived from an aromatic vinyl compound and monomer units derived from a conjugate diene compound, a hydrogenated product of an aromatic vinyl compound-conjugate diene compound-aromatic vinyl compound polymer is preferred.

Examples of the method for producing the component (B) include the method disclosed in JP-A-40-23798. Examples of a method for hydrogenating the copolymer comprising monomer units derived from an aromatic vinyl compound and monomer units derived from a conjugate diene compound include the methods disclosed in JP-B-42-8704, JP-B-43-6636, JP-A-59-133203, and JP-A-60-79005. As the copolymer comprising monomer units derived from an aromatic vinyl compound and monomer units derived from a conjugate diene compound, commercially available products such as "KRATON-G" produced by Kraton Polymers, "SEPTON" produced by Kuraray Co., Ltd., and "Tuftec" produced by Asahi Kasei Corporation may be used.

Propylene Polymer (Component (C))

Examples of the propylene polymer (hereinafter referred to as "component (C)") include propylene homopolymers, propylene random copolymers, and propylene polymeric materials. The content of the monomer units derived from propylene in the component (C) is more than 50% by weight but not more than 100% by weight, where the whole amount of the component (C) is taken as 100% by weight. The component (C) may be used singly or two or more thereof may be used in combination.

Examples of said propylene random copolymers include:
(1) a propylene-ethylene random copolymer having a content of monomer units derived from propylene of 90% by weight to 99.5% by weight and a content of monomer units derived from ethylene of 0.5% by weight to 10% by weight, where the total amount of the monomer units derived from propylene and the monomer units derived from ethylene is taken as 100% by weight;
(2) a propylene-ethylene-α-olefin random copolymer having a content of monomer units derived from propylene of 81% by weight to 99% by weight, a content of monomer units derived from ethylene of 0.5% by weight to 9.5% by weight, and a content of monomer units derived from an α-olefin having 4 to 10 carbon atoms of 0.5% by weight to 9.5% by weight, where the total amount of the monomer units derived from propylene, the monomer units derived from ethylene, and the monomer units derived from the α-olefin having 4 to 10 carbon atoms is taken as 100% by weight; or
(3) a propylene-α-olefin random copolymer having a content of monomer units derived from propylene of 90% by weight to 99.5% by weight and a content of monomer units derived from an α-olefin having 4 to 10 carbon atoms of 0.5% by weight to 10% by weight, where the total amount of the monomer units derived from propylene and the monomer units derived from the α-olefin having 4 to 10 carbon atoms is taken as 100% by weight.

Examples of the α-olefins having 4 to 10 carbon atoms in the above-described (1) and (2) include linear α-olefins such as 1-butene, 1-pentene, 1-hexene, 1-octene, and 1-decene; and branched α-olefins such as 3-methyl-1-butene and 3-methyl-1-pentene. Such α-olefins having 4 to 10 carbon atoms may be used individually or alternatively may be used in combination.

Examples of the method for producing a propylene homopolymer and the method for producing a propylene random copolymer include a slurry polymerization method, a solution polymerization method, a bulk polymerization method, a gas phase polymerization method, etc. using a Ziegler-Natta catalyst or a complex-based catalyst known in the art such as a metallocene complex and a non-metallocene complex The propylene polymeric material is a polymeric material composed of a propylene homopolymer component (I) and an ethylene copolymer component (II) comprising monomer units derived from at least one selected from the group consisting of propylene and α-olefins having 4 or more carbon atoms and monomer units derived from ethylene. The content of the propylene homopolymer component (I) in the propylene polymeric material is 70% by weight to 90% by weight, and the content of the ethylene copolymer component (II) is 10% by weight to 30% by weight. The content of the propylene homopolymer component (I) is preferably 75% by weight to 90% by weight, and the content of the ethylene copolymer component (II) is preferably 10% by weight to 25% by weight in order to render the thermoplastic elastomer composition less prone to pollute a mold during its molding and improve the appearance of a molded article. The overall amount of the propylene polymeric material is taken as 100% by weight.

The α-olefin having 4 or more carbon atoms in the ethylene copolymer component (II) is preferably an α-olefin having 4 to 20 carbon atoms, and examples thereof include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, a 1-octadecene, 1-nonadecene, 1-eicosene, 3-methyl-1-butene, 3-methyl-1-pentene, 4-methyl-1-pentene, 2-ethyl-1-hexene, and 2,2,4-trimethyl-1-pentene. Such an α-olefin having 4 or more carbon atoms is preferably an α-olefin having 4 to 10 carbon atoms and is more preferably 1-butene, 1-hexene, or 1-octene. Such α-olefins having 4 to 10 carbon atoms may be used individually or alternatively may be used in combination.

The content of the monomer units derived from ethylene in the ethylene copolymer component (II) is 22% by weight to 80% by weight, preferably 25% by weight to 70% by weight, and more preferably 27% by weight to 60% by weight in order to render the thermoplastic elastomer composition less prone to pollute a mold during its molding and improve the appearance of a molded article. In order to render the thermoplastic elastomer composition less prone to pollute a mold during its molding and improve the appearance of a molded article, the content of the monomer units derived from at least one selected from the group consisting of propylene and α-olefins having 4 or more carbon atoms in the ethylene copolymer component (II) is 20% by weight to 78% by weight, preferably 30% by weight to 75% by weight, and more preferably 40% by weight to 73% by weight, where the combined content of the monomer units derived from at least one selected from the group consisting of propylene and α-olefins having 4 or more carbon atoms and the monomer units derived from ethylene is taken as 100% by weight. The content of the monomer units derived from ethylene and the content of the monomer units derived from at least one selected from the group consisting of propylene and α-olefins having 4 to 10 carbon atoms can be determined by infrared spectroscopy. Specifically, the infrared absorption spectrum of the ethylene copolymer component (II) is measured by using an infrared spectrophotometer, and then the content of the monomer units derived from ethylene and the content of the monomer units derived from at least one selected from the group consisting of propylene and α-olefins having 4 or more carbon atoms are determined in accordance with the method disclosed in "Characterization of Polyethylene by Infrared Absorption Spectrum" (Takayama, Usami, et al.) or "Die Makromolekulare Chemie, 177, 461 (1976)" (Mc Rae, M. A., Madam S, W. F. et al.).

Examples of the ethylene copolymer component (II) include a propylene-ethylene copolymer, an ethylene-1-butene copolymer, an ethylene-1-hexene copolymer, an ethylene-1-octene copolymer, a propylene-ethylene-1-butene copolymer, a propylene-ethylene-1-hexene copolymer, and a propylene-ethylene-1-octene copolymer; a propylene-ethylene copolymer or a propylene-ethylene-1-butene copolymer is preferable. The ethylene copolymer component (II) may be either a random copolymer or a block copolymer.

In order to render the thermoplastic elastomer composition less prone to pollute a mold during its molding and improve the appearance of a molded article, the intrinsic viscosity of the portion soluble in xylene at 20° C. (hereinafter "CXS portion") of the propylene polymeric material (this intrinsic viscosity is hereinafter expressed by [ηcxs]) is preferably 1.5 dl/g to 8.0 dl/g, more preferably 2.0 dl/g to 7.0 dl/g, and even more preferably 2.2 dl/g to 7.0 dl/g. The ratio of [ηcxs] to the intrinsic viscosity ([ηcxis]) of the portion insoluble in xylene at 20° C. (hereinafter "CXIS portion") (this intrinsic viscosity is hereinafter expressed by [ηcxis]) is preferably from 1.5 to 12. Such an intrinsic viscosity is a value obtained by measuring a reduced viscosity in tetralin at 135° C. with an Ubbelohde viscometer and then calculating the value by an extrapolation method in accordance with the calculation method disclosed in "Kobunshi Yoeki (Polymer Solution), Kobunshi Jikkengaku (Polymer Experiment Study) Vol. 11" page 491 (published by Kyoritsu Shuppan Co., Ltd., 1982).

Here, the CXS portion and the CXIS portion are obtained by the following method. After completely dissolving the propylene polymeric material in boiling xylene, the xylene solution is cooled to room temperature slowly, left at rest at 20° C. for 4 hours or more, and then the precipitate and the solution are separated by filtration. The precipitate is the CXIS portion, and the matter obtained by removing the solvent from the solution is the CXS portion.

One example of a method for producing the propylene polymeric material is a method of performing multistage polymerization using a polymerization catalyst. One example is a method in which the propylene homopolymer component (I) is produced in an earlier polymerization step and the ethylene copolymer component (II) is produced in a later polymerization step using a polymerization catalyst. Examples of the polymerization catalyst to be used for the production of the propylene polymeric material include Ziegler catalysts, Ziegler-Natta catalysts, catalysts composed of a Group 4 transition metal compound having a cyclopentadienyl ring and an alkyl aluminoxane, and catalysts composed of a Group 4 transition metal compound having a cyclopentadienyl ring, a compound capable of reacting with the transition metal compound to form an ionic complex, and an organoaluminum compound.

A preliminarily polymerized catalyst may be used in the presence of the polymerization catalyst. Examples of the preliminarily polymerized catalyst include the catalysts disclosed in JP-A-61-218606, JP-A-61-287904, JP-A-5-194685, JP-A-7-216017, JP-A-9-316147, JP-A-10-212319, and JP-A-2004-182981.

Examples of the polymerization method used in the production of the propylene polymeric material include bulk polymerization, solution polymerization, slurry polymerization, and gas phase polymerization. Examples of an inert hydrocarbon solvent to be used for solution polymerization and slurry polymerization include propane, butane, isobutane, pentane, hexane, heptane, and octane. These polymerization methods may be performed in combination and also may be either in a batch mode or in a continuous mode. As the polymerization method used in the production of the propylene polymeric material, continuous gas phase polymerization and bulk-gas phase polymerization in which bulk polymerization and gas phase polymerization are performed continuously are preferred.

In order to render the thermoplastic elastomer composition less prone to pollute a mold during its molding and improve the tensile properties, flame retardancy, and the appearance of a molded article, the melt flow rate of the component (C) measured at 230° C. and a load of 21.18 N in accordance with JIS K7210 is preferably 0.1 g/10 minutes to 300 g/10 minutes, more preferably 10 g/10 minutes to 80 g/10 minutes, and even more preferably 20 g/10 minutes to 70 g/10 minutes.

The isotactic pentad fraction of the component (C) measured by 13C-NMR is preferably 0.95 or more, more preferably 0.98 or more.

The isotactic pentad fraction is the fraction of the propylene monomer units located at the centers of the isotactic sequences in the pentad units within a molecule chain of the component (C), in other words, the fraction of the propylene monomer units located within the sequences (henceforth represented by mmmm) in which five propylene monomer units are contiguously meso-bonded. The method for measuring the isotactic pentad fraction is the method disclosed by A. Zambelli, et al. in Macromolecules 6, 925 (1973), i.e., a method measured with $^{13}$C-NMR.

Specifically, the ratio of the area of an absorption peak assigned to mmmm to the area of an absorption peak assigned to a methyl carbon, both measured using a $^{13}$C-NMR spectrum, is the isotactic pentad fraction.

The melting temperature of the component (C) is preferably 100° C. or more. When the component (C) is a propylene homopolymer or a propylene polymeric material, the melting temperature of the component (C) is more preferably 155° C. or more, and even more preferably 160° C. or more. When the component (C) is a propylene random copolymer, the melting temperature of the component (C) is more preferably 130° C. or more, and even more preferably 135° C. or more. The melting temperature of the component (C) is preferably 175° C. or less. The melting temperature is a peak temperature of an endothermic peak at which the peak temperature is highest in a differential scanning calorimetry curve measured with a differential scanning calorimeter during a temperature raising operation. The conditions for measuring a differential scanning calorimetry curve with a differential scanning calorimeter are as follows.

<Measurement Conditions>

Temperature falling operation: after melting the component (C) at 220° C., the temperature is fallen from 220° C. to –90° C. at a temperature ramp-down rate of 5° C./minute.

Temperature raising operation: immediately after the lowering of the temperature from 220° C. to –90° C., the temperature is raised from –90° C. to 200° C. at a temperature ramp-up rate of 5° C./minute.

The content of the component (A) in the thermoplastic elastomer composition is 95% by weight or less relative to 100% by weight in total of the components (A), (B), and (C), and in order to render the thermoplastic elastomer composition less prone to pollute a mold during its molding and improve the tensile properties and the appearance of a molded article, it is preferably 90% by weight or less, more preferably 80% by weight or less. On the other hand, it is preferably 15% by weight or more, more preferably 30% by weight or more, and even more preferably 50% by weight or more.

The content of the component (B) in the thermoplastic elastomer composition is 20 parts by weight or less, preferably 95% by weight or less, more preferably 90% by weight or less, and even more preferably 80% by weight or less relative to 100% by weight in total of the components (A), (B), and (C) in order to render the thermoplastic elastomer less prone to pollute a mold during its molding and improve the flame retardancy, the tensile properties and the appearance of a molded article.

The content of the component (C) in the thermoplastic elastomer composition is 5% by weight to 85% by weight relative to 100% by weight in total of the components (A), (B), and (C), and in order to render the thermoplastic elastomer composition less prone to pollute a mold during its molding and improve the tensile properties, the softness and the appearance of a molded article, it is preferably 10% by weight to 70% by weight, more preferably 20% by weight to 50% by weight.

The weight ratio of the total of the component (A) and the component (B) to the component (C) in the thermoplastic elastomer composition ((the weight of the component (A) and the weight of the component (B))/the weight of the component (C)) is 0.7 to 10, and in order to render the thermoplastic elastomer composition less prone to pollute a mold during its molding and improve the tensile properties, the softness and the appearance of a molded article, it is preferably 1 to 5, more preferably 1 to 4.

Phosphoric Acid Salt Compound (Component (D))

Examples of the phosphoric acid salt compound (hereinafter referred to as "component (D)") include a phosphate, a polyphosphate, and a compound containing such a phosphate or a polyphosphate as a main component.

Examples of such a phosphate include melamine orthophosphate, piperazine orthophosphate, melamine pyrophosphate, piperazine pyrophosphate, calcium phosphate, and magnesium phosphate.

Examples of such a polyphosphate include ammonium polyphosphate, piperazine polyphosphate, and melamine polyphosphate.

The component (D) may be used singly or two or more thereof may be used in combination.

As the component (D), melamine pyrophosphate, piperazine pyrophosphate, or ammonium polyphosphate is preferred, and it is more preferred to use piperazine pyrophosphate and melamine pyrophosphate in combination. When piperazine pyrophosphate and melamine pyrophosphate are used in combination, the weight ratio of melamine pyrophosphate to piperazine pyrophosphate (the weight of melamine pyrophosphate/the weight of piperazine pyrophosphate) is preferably from 0.25 to 1.0.

There can be used compounds named by replacing the term "melamine" or "piperazine" in the above examples of the phosphoric acid salt compound and the polyphosphoric acid salt by N,N,N',N'-tetramethyldiaminomethane, ethylenediamine, N,N'-dimethylethylenediamine, N,N'-diethylethylenediamine, N,N-dimethylethylenediamine, N,N-diethylethylenediamine, N,N,N',N'-tetramethylethylenediamine, N,N,N',N'-diethylethylenediamine, 1,2-propanediamine, 1,3-propanediamine, tetramethylenediamine, pentamethylenediamine, hexamethylenediamine, 1,7-diaminoheptane, 1,8-diaminooctane, 1,9-diaminononane, 1,10-diaminodecane, trans-2,5-dimethylpiperazine, 1,4-bis(2-aminoethyl)piperazine, 1,4-bis(3-aminopropyl)piperazine, acetoguanamine, benzoguanamine, acrylic guanamine, 2,4-diamino-6-nonyl-1,3,5-triazine, 2,4-diamino-6-hydroxy-1,3,5-triazine, 2-amino-4,6-dihydroxy-1,3,5-triazine, 2,4-diamino-6-methoxy-1,3,5-triazine, 2,4-diamino-6-ethoxy-1,3,5-triazine, 2,4-diamino-6-propoxy-1,3,5-triazine, 2,4-diamino-6-isopropoxy-1,3,5-triazine, 2,4-diamino-6-mercapto-1,3,5-triazine, 2-amino-4,6-dimercapto-1,3,5-triazine, ammeline, phthalodiguanamine, melamine cyanurate, melamine pyrophosphate, butylenediguanamine, norbornenediguanamine, methylenediguanamine, ethylenedimelamine, trimethylenedimelamine, tetramethylenedimelamine, hexamethylenedimelamine, or 1,3-hexylenedimelamine.

Examples of commercially available component (D) include "ADK STAB FP-2100J" produced by ADEKA Corporation, and "EXOLIT AP422" and "EXOLIT AP462" produced by Clariant Japan K.K.

The content of the component (D) in the thermoplastic elastomer composition is 35 parts by weight to 200 parts by weight, preferably 45 parts by weight to 150 parts by weight, more preferably 50 parts by weight to 120 parts by weight, relative to 100 parts by weight in total of the components (A), (B) and (C) in order to render the thermoplastic elastomer composition less prone to pollute a mold during its molding and improve the tensile properties, the flame retardancy, the softness, and the appearance of a molded article.

Phosphoric Acid Ester (Component (E))

Examples of the phosphoric acid ester (hereinafter referred to as "component (E)") include an aromatic phosphate, an aliphatic phosphate, and an oligomer or polymer obtained from an aromatic phosphate and an aliphatic phosphate.

Examples of the aliphatic phosphate include trimethyl phosphate, tributyl phosphate, tri(2-ethylhexyl) phosphate, tributoxyethyl phosphate, monoisodecyl phosphate, and 2-acryloyloxyethyl phosphate.

Examples of the aromatic phosphate include trixylenyl phosphate, tris(phenylphenyl) phosphate, trinaphthyl phosphate, cresyldiphenyl phosphate, xylenyldiphenyl phosphate, diphenyl-2-methacrylolyloxyethyl phosphate, resorcinol bis(diphenyl phosphate), resorcinol bis(dixylenyl phosphate), resorcinol bis(dicresyl phosphate), hydroquinone bis(dixylenyl phosphate), bisphenol A bis(diphenyl phosphate), and tetrakis(2,6-dimethylphenyl) 1,3-phenylenebisphosphate.

The component (E) may be used singly or two or more thereof may be used in combination. Examples of commercially available component (E) include "ADK STAB FP-600" and "ADK STAB FP-800" produced by ADEKA Corporation, and "CR-733S", "CR-741", and "PX-200" produced by Daihachi Chemical Industry Co., Ltd.

The content of the component (E) in the thermoplastic elastomer composition is 0.1 parts by weight to 40 parts by weight, preferably 0.5 parts by weight to 15 parts by weight, more preferably 1 part by weight to 13 parts by weight, relative to 100 parts by weight in total of the components (A), (B) and (C) in order to render the thermoplastic elastomer composition less prone to pollute a mold during its molding and improve the tensile properties and the appearance of a molded article.

The thermoplastic elastomer composition of the present invention may further comprise a metal oxide (component (F)) or a polyhydric compound (component (G)) in addition to the components (A) through (E).

Metal Oxide (Component (F))

Examples of the metal oxide (hereinafter referred to as "component (F)") include zinc oxide, magnesium oxide, calcium oxide, silicon dioxide, titanium oxide, manganese oxides (MnO, $MnO_2$), iron oxides (FeO, $Fe_2O_3$, $Fe_3O_4$), copper oxide, nickel oxide, tin oxide, aluminum oxide, and calcium aluminate. As the component (F), zinc oxide, magnesium oxide, or calcium oxide is preferred, and zinc oxide is more preferred.

The component (F) may have been surface treated. Examples of commercially available zinc oxide include zinc oxide Type II produced by Seido Chemical Industry Co., Ltd., zinc oxide Type I produced by Mitsui Mining & Smelting Co., Ltd., partially coated type zinc oxide produced by Mitsui Mining & Smelting Co., Ltd., NANO FINE 50 (ultrafine particle zinc oxide having an average particle diameter of 0.02 μm, produced by Sakai Chemical Industry Co., Ltd.), and NANO FINE K (ultrafine particle zinc oxide coated with zinc silicate having an average particle diameter of 0.02 μm, produced by Sakai Chemical Industry Co., Ltd.).

The content of the component (F) in the thermoplastic elastomer composition is 20 parts by weight or less, preferably 0.01 parts by weight to 15 parts by weight, and more preferably 2 parts by weight to 10 parts by weight relative to 100 parts by weight in total of the components (A), (B) and (C) in order to render the thermoplastic elastomer less prone to pollute a mold during its molding and improve the flame retardancy, the tensile properties and the appearance of a molded article.

A mixture prepared by mixing the component (D) and the component (F) beforehand may be used.

In order to render the thermoplastic elastomer less prone to pollute a mold during its molding and improve the flame retardancy and the appearance of a molded article, the weight ratio of the component (D) to the component (F) (the weight of the component (D)/the weight of the component (F)) is preferably from 4 to 100, more preferably from 6 to 50, even more preferably from 10 to 35.

Examples of the mixture prepared by mixing the component (D) and the component (F) beforehand include commercially available products such as "ADK STAB FP-2200S" and "ADK STAB FP-2500S" produced by ADEKA Corporation.

The weight ratio of the total of the component (D) and the component (F) to the component (E) in the thermoplastic elastomer composition ((the weight of the component (D)+ the weight of the component (F))/the weight of the component (E)) is from 5 to 70, preferably from 5 to 40, more preferably from 6.5 to 20 in order to render the thermoplastic elastomer composition less prone to pollute a mold during its molding and improve the tensile properties and the appearance of a molded article.

Polyhydric Compound (Component (G))

The polyhydric compound (hereinafter referred to as "component (G)") is a compound having two or more hydroxy groups. Examples of the component (G) include pentaerythritol, dipentaerythritol, tripentaerythritol, polypentaerythritol (degree of condensation ≥4), trishydroxyethyl isocyanate, polyethylene glycol, glycerol, starch, grape sugar, cellulose, and sorbitol. As the component (G), polyhydric alcohol compounds are preferred because they are poorly soluble in water and slightly hygroscopic, and pentaerythritol, dipentaerythritol, tripentaerythritol, or polypentaerythritol is more preferred, and pentaerythritol is even more preferred.

The content of the component (G) in the thermoplastic elastomer composition is 20 parts by weight or less, preferably 0.1 parts by weight to 10 parts by weight, and more preferably 0.3 parts by weight to 4 parts by weight relative to 100 parts by weight in total of the components (A), (B) and (C) in order to render the thermoplastic elastomer less prone to pollute a mold during its molding and improve the flame retardancy, the tensile properties and the appearance of a molded article.

In order to render the thermoplastic elastomer less prone to pollute a mold during its molding and improve the flame retardancy, the tensile properties and the appearance of a molded article, the weight ratio of the component (G) to the component (E) (the weight of the component (G)/the weight of the component (E)) is preferably from 0.1 to 100, more preferably from 0.2 to 50, even more preferably from 0.5 to 15.

In one embodiment, the above-described thermoplastic elastomer composition does not comprise the above-described component (B). That is, the thermoplastic elastomer composition comprises the component (A), the component (C), the component (D) and the component (E), and the component (F), wherein, based on 100 parts by weight in total of the component (A) and the component (C), the content of the component (D) is 35 parts by weight to 200 parts by weight, the content of the component (E) is 0.1 parts by weight to 40 parts by weight, the content of the component (F) is 0 parts by weight to 20 parts by weight, the weight ratio of the component (A) to the component (C) (the weight of the component (A)/the weight of the component (C)) is from 0.7 to 10, and the weight ratio of the total of the component (D) and the component (F) to the component (E) ((the weight of the component (D)+ the weight of the component (F))/the weight of the component (E)) is from 5 to 70.

In this embodiment, the content of the component (A) in the thermoplastic elastomer composition is 15% by weight to 95% by weight relative to 100% by weight in total of the component (A) and the component (C), and in order to render the thermoplastic elastomer composition less prone to pollute a mold during its molding and improve the tensile properties and the appearance of a molded article, it is preferably 30% by weight to 90% by weight, more preferably 50% by weight to 80% by weight. In addition, the content of the component (C) in the thermoplastic elastomer composition is 5% by weight to 85% by weight relative to 100% by weight in total of the component (A) and the component (C), and in order to render the thermoplastic elastomer composition less prone to pollute a mold during its molding and improve the tensile properties and the appearance of a molded article, it is preferably 10% by weight to 70% by weight, more preferably 20% by weight to 50% by weight.

The weight ratio of the component (A) to the component (C) in the thermoplastic elastomer composition (the weight of the component (A)/the weight of the component (C)) is 0.7 to 10, and in order to render the thermoplastic elastomer composition less prone to pollute a mold during its molding and improve the tensile properties and the appearance of a molded article, it is preferably 1 to 5, more preferably 1 to 4.

The thermoplastic elastomer composition of the present invention may comprise other additives or other resins in addition to the above-described components (A) through (G).

Examples of such other additives include mineral oils, flame retardants (excluding the component (D)), flame retardant aids (excluding the component (E) and the component (F)), cross-linking agents, inorganic fillers, organic fillers, antioxidants, weathering stabilizers, UV absorbers, heat stabilizers, light stabilizers, antistatic agents, nucleating agents, pigments, adsorbents, metal chlorides, lubricants, and silicone compounds.

Examples of the mineral oils include high-boiling fractions of petroleum (having an average molecular weight of 300 to 1500 and a pour point of 0° C. or lower), such as aromatic mineral oils, nathphenic mineral oils, and paraffinic mineral oils. Especially, paraffinic mineral oils are preferred as a mineral oil.

The mineral oil may be blended as an extending oil of the component (A). Examples of a method for blending a mineral oil as an extender oil for the component (A) include a method comprising mechanically kneading the component (A) and the mineral oil with a roll, a Banbury mixer, or the like, a method comprising adding a prescribed amount of a mineral oil to a solution of the component (A) to obtain a mixture solution, and then removing a solvent from the mixture solution by such a method as a spray drying method, a steam stripping method, a supercritical drying method using carbon dioxide or the like, and a method comprising adding an oil directly to a rubber in a latex state, stirring them, and then solidifying the rubber.

The content of the mineral oil in the thermoplastic elastomer composition is preferably 100 parts by weight or less, more preferably 80 parts by weight or less, and even more preferably 60 parts by weight or less relative to 100 parts in total of the components (A), (B) and (C) in order to improve the flame retardancy, the tensile properties and the softness of a molded article.

In order to render the thermoplastic elastomer less prone to pollute a mold during its molding and improve the flame retardancy, the tensile properties, the softness, and the appearance of a molded article, the weight ratio of the mineral oil to the component (A) (the weight of the mineral oil/the weight of the component (A)) is preferably from 0.01 to 2, more preferably from 0.05 to 1.7, even more preferably from 0.1 to 1.5.

The flame retardants (excluding the component (D)) and the flame retardant aids (excluding the component (E) and the component (F)) may be those commonly used in combination with a polyolefin. Examples of the flame retardants (excluding the component (D)) include metal hydroxides such as magnesium hydroxide and aluminum hydroxide, halogen-containing flame retardants, silicon-containing flame retardants, and melamine cyanurate. Examples of the flame retardant aid (excluding the components (E) and (F)) include polytetrafluoroethylene. The flame retardant (excluding the component (D)) and the flame retardant aid (excluding the components (E) and (F)) may be used individually and two or more thereof may be used.

The content of the flame retardant (excluding the component (D)) is preferably 200 parts by weight or less relative to 100 parts by weight in total of the components (A), (B) and (C), and the content of the flame retardant aid (excluding the components (E) and (F)) is preferably 200 parts by weight or less relative to 100 parts by weight in total of the components (A), (B) and (C).

Examples of the inorganic fillers include talc, calcium carbonate, and calcined kaolin. Examples of the organic fillers include fiber, wood flour, and cellulose powder. Examples of antioxidants include phenol-based antioxidants, sulfur-containing antioxidants, phosphorus-containing antioxidants, lactone-based antioxidants, and vitamin-based antioxidants. Examples of the UV absorbers include benzotriazole-based UV absorbers, triazine-based UV absorbers, anilide-based UV absorbers, and benzophenone-based UV absorbers. Examples of the light stabilizers include hindered amine light stabilizers and benzoate-based light stabilizers. Examples of the metal halides include iron chloride and calcium chloride. Examples of the lubricants include fatty acids, higher alcohols, aliphatic amides, and aliphatic esters.

Examples of other resins include novolac type phenolic resins having alkyl groups, ethylene resin having more than 95% by weight and not more than 100% by weight of monomer units derived from ethylene where the whole amount of the ethylene resin is taken as 100% by weight, polymers of an α-olefin having 4 or more carbon atoms, ethylene polymers having monomer units derived from a carboxylic acid ester, vinyl halide polymers, ester resins, amide resins, acrylic resins, styrene resins, carbonate resins, urea resins, melamine resins, and epoxy resins.

As the novolac type phenolic resins having alkyl groups, a condensate of phenol with at least one hydrogen atom thereof having been substituted with an alkyl group having 2 to 20 carbon atoms and an aldehyde having 1 to 5 carbon atoms is preferred.

Examples of the alkyl group having 2 to 20 carbon atoms include linear alkyl groups such as an ethyl group, a n-propyl group, a n-butyl group, a n-pentyl group, a n-octyl group, a n-nonyl group, a n-decyl group, a n-undecanyl group, a n-octadecyl group, and a n-dodecyl group; branched alkyl groups such as an isopropyl group, a t-butyl group, and an ethylhexyl group; and alicyclic alkyl groups, such as a cyclopentyl group and a cyclohexyl group. As the alkyl group having 2 to 20 carbon atoms, an alkyl group having 4 to 18 carbon atoms is preferred.

Examples of the aldehyde having 1 to 5 carbon atoms include aldehydes such as formaldehyde, acetaldehyde, n-butylaldehyde, glyoxal, glutaraldehyde, glyoxylic acid, and paraformaldehyde; formaldehyde, acetaldehyde, or paraformaldehyde is preferred, and formaldehyde is more preferred.

As the novolac type phenolic resins having alkyl groups, "HITANOL 1501" (registered trademark; produced by Hitachi Chemical Co., Ltd.), "TACKIROL 101" (registered trademark; produced by Taoka Chemical Co., Ltd.), or "TAMANOL 7508" (registered trademark; produced by Arakawa Chemical Industries, Ltd.) may be used, for example.

The content of the novolac type phenolic resins having alkyl groups is preferably 20 parts by weight or less, more preferably 0.5 parts by weight to 10 parts by weight, and even more preferably 1 part by weight to 5 parts by weight, relative to 100 parts by weight in total of the components (A), (B) and (C).

Examples of the ethylene resin having more than 95% by weight and not more than 100% by weight of monomer units derived from ethylene where the whole amount of the ethylene resin is taken as 100% by weight include an ethylene homopolymer, and a copolymer comprising monomer units derived from ethylene and monomer units derived from at least one selected from the group consisting of propylene and α-olefins having 4 to 10 carbon atoms.

Examples of said polymers of an α-olefin having 4 or more carbon atoms include polybutene-1 and poly-3-methylpentene.

Examples of said ethylene polymers having monomer units derived from a carboxylic acid ester include an ethylene-vinyl acetate copolymer, an ethylene-vinyl propionate copolymer, an ethylene-methyl acrylate copolymer, an ethylene-ethyl acrylate copolymer, an ethylene-butyl acrylate copolymer, an ethylene-methyl methacrylate copolymer, an ethylene-ethyl methacrylate copolymer, an ethylene-glycidyl methacrylate copolymer, and an ethylene-vinyl acetate-methyl methacrylate copolymer.

Examples of said vinyl halide copolymers include a vinyl chloride polymer, a vinylidene chloride polymer, a vinylidene fluoride polymer, a vinyl chloride-vinyl acetate copolymer, a vinyl chloride-ethylene copolymer, a vinyl chloride-vinylidene chloride copolymer, a vinyl chloride-vinylidene chloride-vinyl acetate terpolymer, a vinyl chloride-acrylic acid ester copolymer, a vinyl chloride-maleic acid ester copolymer, and a vinyl chloride-cyclohexylmaleimide copolymer.

Examples of said ester resins include polyethylene terephthalate, polybutylene terephthalate, polycyclohexanedimethylene terephthalate, polyethylene naphthalate, polybutylene naphthalate, polytetramethylene terephthalate, polyhydroxybutyrate, polycaprolactone, polybutylene succinate, polyethylene succinate, polylactic acid, polymalic acid, polyglycolic acid, polydioxanone, and poly(2-oxetanone). Examples of said amide resins include polyamides such as polyphenylene oxide, polycaprolactam, polyhexamethylene adipamide, and examples of said acrylic resins include a methyl methacrylate polymer and a methyl acrylate polymer. Examples of said styrene resins include polystyrene, AS resin, ABS resin, and MBS resin.

The method for producing the thermoplastic elastomer composition of the present invention may be a method comprising melt-kneading the components (A) through (E), and optionally the component (F), the component (G), other additives, and other resins. Examples of a melt-kneading apparatus include a mixing roll, which is of an open type, a Banbury mixer an extruder, a kneader, and a continuous mixer, which are of a non-open type; apparatuses of a non-open type are preferred. It is permitted to melt-knead at once all components to be kneaded, or it is also permitted to knead some components and then add the remaining components, followed by melt-kneading. The melt-kneading may be carried out either once or twice or more. The melt-kneading temperature is preferably 150° C. to 250° C. and the melt-kneading time is preferably 30 seconds to 30 minutes. The components to be kneaded may be added in any arbitrary order and may be added simultaneously.

The component (F), the component (G), other additives, and other resins may be blended beforehand with the components (A) to (E) before melt-kneading, or they may be added after or during the melt-kneading of the components (A) to (E).

A crosslinking agent may be added during the production of the thermoplastic elastomer composition. Examples of such a crosslinking agent include organic peroxides, sulfur compounds, and alkylphenol resins; organic peroxides are preferred.

Examples of such organic peroxides include ketone peroxides, diacyl peroxides, hydroperoxides, dialkyl peroxides, peroxyketals, alkyl peresters, percarbonates, peroxydicarbonates, and peroxyesters known in the art.

Examples of specific organic peroxides include dicumyl peroxide, 2,5-dimethyl-2,5-di-(tert-butylperoxy)hexane, 2,5-dimethyl-2,5-di(tert-butylperoxy)hexyne, 1,3-bis(tert-butylperoxyisopropyl)benzene, tert-butyl cumyl peroxide, di-tert-butyl peroxide, 2,2,4-trimethylpentyl-2-hydroperoxide, diisopropylbenzohydroperoxide, cumene peroxide, tert-butyl peroxide, 1,1-di-tert-butylperoxy)3,5,5-trimethylcyclohexane, 1,1-di-tert-butylperoxycyclohexane, isobutyl peroxide, 2, 4-dichlorobenzoyl peroxide, o-methylbenzoyl peroxide, bis-3,5,5-trimethylhexanoyl peroxide, lauroyl peroxide, benzoyl peroxide, and p-chlorobenzoyl peroxide. Organic peroxides may be used singly or two or more thereof may be used in combination.

The crosslinking agent may be used with a crosslinking coagent. Preferable crosslinking coagents are compounds having two or more double bonds. Examples of such a crosslinking coagent include peroxide crosslinking coagents, such as N,N-m-phenylenebismaleimide, toluylene bismaleimide, p-quinonedioxime, nitrosobenzene, diphenylguanidine, and trimethylolpropane, and divinylbenzene, triallyl cyanurate, triallyl isocyanurate, ethylene glycol dimethacrylate, polyethylene glycol dimethacrylate, trimethylolpropane trimethacrylate, and allyl methacrylate; trimethylolpropane trimethacrylate is preferred.

The added amount of the crosslinking agent is preferably 10 parts by weight or less relative to 100 parts by weight in total of the components (A), (B) and (C).

When a crosslinking coagent is used with a crosslinking agent, the added amount of the crosslinking coagent is preferably 10 parts by weight or less relative to 100 parts by weight in total of the components (A), (B) and (C).

When a crosslinking agent is added during the production of the thermoplastic elastomer composition of the present invention, a method comprising a step of melt-kneading the component (A) and the component (C) in the presence of a crosslinking agent to produce a thermoplastic elastomer is preferred as a method for producing a thermoplastic elastomer composition.

The Shore A durometer hardness (measured in accordance with JIS K6253) of a molded article made of the thermoplastic elastomer composition is preferably 30 to 99, more preferably 50 to 97, and even more preferably 60 to 95.

The density of a molded article made of the thermoplastic elastomer composition is preferably 0.8 g/cm$^3$ to 2 g/cm$^3$, more preferably 0.9 g/cm$^3$ to 1.5 g/cm$^3$, even more preferably 0.95 g/cm$^3$ to 1.3 g/cm$^3$, and further more preferably 1.0 g/cm$^3$ to 1.2 g/cm$^3$. The density is measured without annealing by the method specified in JIS K7112.

The elongation at break (measured at a tensile rate of 200 mm/minute using a JIS No. 3 specimen in accordance with JIS K6251) of a molded article made of the thermoplastic elastomer compositions is preferably 300% or more, and more preferably 500% or more.

Examples of a method for producing a molded article made of the thermoplastic elastomer composition include a method known in the art, such as extrusion forming, calendering, and injection molding, using an ordinary apparatus to be used for molding of a thermoplastic resin.

Molded articles made of the thermoplastic elastomer composition can be used for automobile parts, railway vehicle parts, electrical machinery parts, household electric appliance parts, packaging members, materials for agriculture, members for building, etc. They can be used, for example, for materials for covering wires (an insulated wire, a twisted pair cable, a flat cable, a coaxial cable, etc.) and electronic parts (a connector, a capacitor, an ink cartridge, a household appliance housing, an ECU case, a switch, an inverter part, an electronic substrate, a connector cover, etc.)

EXAMPLES

The present invention is described in more detail based on examples, but the invention is not limited to the Examples.

(1) Mooney Viscosity ($ML_{1+4}$121° C.)

Measurement was conducted in accordance with JIS K6300.

(2) Melt Flow Rate (MFR; Unit: g/10 Minutes)

Measurement was carried out at 230° C. under a load of 21.18 N in accordance with JIS K7210.

(3) Content of Monomer Units Derived from Ethylene (Unit: % by Weight)

The component (A) was fabricated into a film having a thickness of about 0.1 mm, and the infrared absorption spectrum of the film was measured using an infrared spectrophotometer, and then the content of the monomer units derived from ethylene was calculated in accordance with the method disclosed in literature "Characterization of Polyethylene by Infrared Absorption Spectrum" (Takayama, Usami, et al.) or "Die Makromolekulare Chemie, 177, 461 (1976)" (Mc Rae, M. A., Madam S, W. F. et al.).

(4) Method for Producing an Injection Molded Article

Using an injection molding machine IS100EN manufactured by Toshiba Machine Co., Ltd. and a side gate flat mold, the thermoplastic elastomer compositions of the examples and the comparative examples were injection molded under conditions including a cylinder temperature of 220° C. and a mold temperature of 50° C., thereby obtaining injection molded articles (90 mm in length, 150 mm in width, and 2 mm in thickness).

(5) Method for Producing an Extruded Article

Using a 25 mmϕ extruder USV manufactured by Union Plastic Co., Ltd., the thermoplastic elastomer compositions of the examples and the comparative examples were extruded under conditions including a cylinder temperature of 200° C., use of a full-flight type screw, and a screw speed of 40 rpm, thereby obtaining extruded articles (90 mm in width and 1 mm in thickness). At the time of an inflammability test, an extruded article having a width of 90 mm and a thickness of 1.5 mm was produced under the same conditions as above, and a specimen having a length of 127 mm, a width of 12.7 mm, and a thickness of 1.5 mm was cut from the extruded article and was used.

(6) Hardness

Shore A durometer hardness of the injection molded articles produced in (4) above or the extruded articles produced in (5) above was measured in accordance with JIS K6253 at a time 15 seconds after the beginning of the measurement.

(7) Density (Unit: g/Cm$^3$)

The density of the component (A) was measured without annealing by the method specified in JIS K6760-1981. The density of the injection molded articles produced in (4) above or the extruded articles produced in (5) above was measured without annealing by the method specified in JIS K7112.

(8) Tensile Elongation at Break (Unit: %)

Measurement of the tensile elongation at break of the injection molded articles produced in (4) above or the extruded articles produced in (5) above was carried out in accordance with JIS K6251. Measurement was carried out at a tensile rate of 200 mm/minute using a JIS No. 3 specimen.

(9) Flame Retardancy Test

A flame retardancy test was carried out by performing measurement using specimens produced in (5) above in accordance with UL-94V. A specimen was kept vertical, then a fire of burner was brought to the bottom end of the specimen closely for 10 seconds and the burner was taken away. The length of time taken until the fire of the specimen went out was measured. As soon as the fire went out, the fire of burner was again brought to the bottom end of the specimen closely for 10 seconds. The length of time taken until the fire of the specimen went out was measured in the same way as the first time. In addition, it was evaluated whether the cotton placed under the specimen began to burn or not due to the dropping of live charcoal on it.

From the burning times and whether the cotton began to burn or not in the first and second tests, the burning-rank was set according to the UL-94V standard. Flame retardancy rank "○" was given to samples the burning rank of which corresponds to V-O, and flame retardancy rank "×" was given to samples the burning rank of which correspond to none of V-0 through V-2.

(10) Pollution of a Mold During Injection Molding

Using an injection molding machine IS100EN manufactured by Toshiba Machine Co., Ltd. and a side gate flat mold, a thermoplastic elastomer composition was injection molded under conditions including a cylinder temperature of 220° C. and a mold temperature of 50° C.

Rank "5" was given to cases where the mold was not polluted even after performing ten cycles of injection molding, rank "4" was given to cases where the mold was polluted partly after performing ten cycles of injection molding, rank "3" was given to cases where the mold was polluted entirely after performing ten cycles of injection molding, rank "3" was given to cases where the mold was polluted partly after performing one cycle of injection molding, and rank "1" was given to cases where the mold was polluted entirely after performing one cycle of injection molding.

(11) Evaluation of the Surface of a Strand

The surface condition of a strand extruded through a die nozzle of a single screw extruder VS30-28 vent manufactured by Tanabe Plastics Machinery Co., Ltd. was evaluated visually on five scales.

Rank "5" was given to cases where roughness was not observed on the surface of a strand at all and no foaming was observed in a cross section of the strand, rank "4" was given to cases where roughness was observed partly on the surface of a strand but no foaming was observed in a cross section of the strand, rank "3" was given to cases where roughness was observed entirely on the surface of a strand but no foaming was observed in a cross section of the strand, rank "2" was given to cases where roughness was observed entirely on the surface of a strand and foaming was observed partly in a cross section of the strand, and rank "1" was given to cases where roughness was observed entirely on the surface of a strand and foaming was observed in a cross section of the strand.

The larger the number of the five-scale rate, the better the appearance of a molded article.

(12) Amount of Die Drool

Using a 25 mmϕ extruder USV manufactured by Union Plastic Co., Ltd., 1 kg of a thermoplastic elastomer composition was extruded by using a T die under conditions including a cylinder temperature of 200° C., use of a full-flight type screw, and a screw speed of 40 rpm.

Appearance rank "○" was given to cases where the total amount of die drool existing at the die part of the extruder and on the molded article was less than 10 mg/kg, and appearance rank "x" was given to cases where the total amount of die drool was 10 mg/kg or more.

The materials used in the Examples are as follows.
Component (A): Ethylene-α-olefin copolymer
(A1-1) Ethylene-1-octene copolymer
  Engage 8100 produced by The Dow Chemical Company
  (the content of monomer units derived from ethylene=63% by weight, Mooney viscosity (ML$_{1+4}$121° C.)=24, density=0.870 g/cm$^3$)
(A2-1) Ethylene-1-butene copolymer
  Engage 7467 produced by The Dow Chemical Company
  (the content of monomer units derived from ethylene=69% by weight, Mooney viscosity (ML$_{1+4}$121° C.)=19, density=0.862 g/cm$^3$)
(A2-2) Ethylene-1-butene copolymer
  Engage 7387 produced by The Dow Chemical Company
  (the content of monomer units derived from ethylene=74% by weight, Mooney viscosity (ML$_{1+4}$121° C.)=54, density=0.870 g/cm$^3$)
Component (B): Copolymer Comprising Monomer Units Derived from an Aromatic Vinyl Compound and Monomer Units Derived from a Conjugate Diene Compound
(B-1): Trade name "Kraton G1651HS" produced by Kraton Polymer Japan, Inc., Component (C): Polypropylene Resin
(C-1) Propylene homopolymer "NOBLEN D101" produced by Sumitomo Chemical Co., Ltd.
(C-2) Propylene polymeric material "NOBLEN AZ864" produced by Sumitomo Chemical Co., Ltd.
(C-3) Propylene polymeric material "NOBLEN AZ564" produced by Sumitomo Chemical Co., Ltd.
Component (D): Phosphoric Acid Salt Compound
(D-1) Trade name "ADK STAB FP-2100J" produced by ADEKA, Inc.
Mixture of component (D) phosphoric acid salt compound and (F) metal oxide (zinc oxide)
((D-2)+(F-1)) Trade name "ADK STAB FP-2500S" (phosphoric acid salt and zinc oxide) produced by ADEKA, Inc.
((D-3)+(F-1)) Trade name "ADK STAB FP-2200S" (phosphoric acid salt and zinc oxide) produced by ADEKA, Inc.
Component (E): Phosphoric Acid Ester
(E-1) Trade name "ADK STAB FP-600" produced by ADEKA, Inc.
(a reaction product of phenol, 4,4'-(propane-2,2-diyl)diphenol, and trichlorophosphine oxide)
Component (G): Polyhydric Compound
(G-1) Trade name "Pentarit" (pentaerythritol) produced by Koei Chemical Co., Ltd.
Mineral oil: Trade name "PW-380" produced by Idemitsu Kosan Co., Ltd.
Antioxidant: Trade name "IRGAFOS 1010" produced by BASF Japan
Diazo weathering stabilizer: Trade name "SUMISORB 300" produced by Sumitomo Chemical Co., Ltd.
HALS type weathering stabilizer: Trade name "TINUVIN 622SF" produced by BASF Japan
Black pigment: Trade name "PEM8020" produced by Sumika Color Co., Ltd.
Low density polyethylene comprising 95% by weight or more of monomer units derived from ethylene: Trade name "G201" produced by Sumitomo Chemical Co., Ltd. Novolac type phenolic resin having alkyl substituents: Trade name "HITANOL 1501" produced by Hitachi Chemical Co., Ltd.

Example 1

(Production of Thermoplastic Elastomer Composition)

A pelletized thermoplastic resin composition was obtained by melt-kneading 30.3% by weight of an ethylene-α-olefin copolymer (A1-1), 2.4% by weight of an ethylene-α-olefin copolymer (A2-1), and 27.3% by weight of a propylene polymer (C-3) as well as, based on 100 parts by weight in total of the components (A1-1), (A2-1), and (C-3), 53.1 parts by weight of a mixture ((D-2)+(F-1)) of a phosphoric acid salt compound (D-2) and a metal oxide (F-1), 3.1 parts by weight of a phosphoric acid ester (E-1), 1.5 parts by weight of a polyhydric compound (G-1), 0.2 parts by weight of an antioxidant (IRGANOX 1010), 0.2 parts by weight of a diazo weathering stabilizer (Sumisorb 300), 0.3 parts by weight of a HALS type weathering stabilizer (Tinuvin 622SF), 2.4 parts by weight of a black pigment (PEM8020), and 1.6 parts by weight of a novolac type phenolic resin having alkyl substituents (HITANOL 1501), for 10 minutes by using an intensible mixer (5L-D intensible mixer manufactured by Nippon Roll MFG Co., Ltd.), and then performing pelletization by using a single screw extruder (VS30-28 having a vent).

The thermoplastic elastomer compositions obtained were individually injection molded by the method described in (4)

above, so that molded articles were obtained. The physical property measurements of the molded article are shown in Table 1.

Examples 2 to 8

(Production of Thermoplastic Elastomer Composition)

Thermoplastic elastomer compositions were produced in the same manner as Example 1 using the components and the contents shown in Table 1. The thermoplastic elastomer compositions obtained were individually injection molded by the method described in (4) above, so that molded articles were obtained. The physical property measurements of the molded article are shown in Table 1.

Examples 9 to 13

(Production of Thermoplastic Elastomer Composition)

Thermoplastic elastomer compositions were produced in the same manner as Example 1 using the components and the contents shown in Table 2. The thermoplastic elastomer compositions obtained were individually extruded by the method described in (5) above, so that molded articles were obtained. The physical property measurements of the molded article are shown in Table 2. The evaluation of the pollution of a mold during injection molding was performed by carrying out injection molding by the method of (4) above.

Comparative Examples 1 to 7

(Production of Thermoplastic Elastomer Composition)

Thermoplastic elastomer compositions were produced in the same manner as Example 1 using the components and the contents shown in Table 3. The thermoplastic elastomer compositions obtained were individually injection molded by the method described in (4) above, so that molded articles were obtained. The evaluation of the amount of die drool was carried out by extruding the obtained thermoplastic elastomer compositions by the method described in (5) above. The physical property measurements of the molded article are shown in Table 3.

TABLE 1

| | | Example | | | | | | | |
|---|---|---|---|---|---|---|---|---|---|
| | | 1 | 2 | 3 | 4 | 5 | 6 | 7 | 8 |
| A1-1 | (% by weight) | 30.3 | 31.2 | 30.3 | 33.3 | 30.5 | 21.2 | 0 | 65.5 |
| A2-1 | (% by weight) | 42.4 | 0 | 0 | 0 | 0 | 0 | 66.7 | 0 |
| A2-2 | (% by weight) | 0 | 42.2 | 42.4 | 36.7 | 17.7 | 14.9 | 0 | 0 |
| B-1 | (% by weight) | 0 | 0 | 0 | 0 | 24.2 | 34.0 | 0 | 0 |
| C-1 | (% by weight) | 0 | 0 | 27.3 | 0 | 0 | 0 | 33.3 | 34.5 |
| C-2 | (% by weight) | 0 | 26.6 | 0 | 30.0 | 27.5 | 29.8 | 0 | 0 |
| C-3 | (% by weight) | 27.3 | 0 | 0 | 0 | 0 | 0 | 0 | 0 |
| D-1 | (parts by weight) | 0 | 0 | 0 | 0 | 0 | 0 | 66.7 | 65.5 |
| D-2 + F-1 | (parts by weight) | 53.1 | 0 | 53.0 | 0 | 51.5 | 0 | 0 | 0 |
| D-3 + F-1 | (parts by weight) | 0 | 50.0 | 0 | 55.0 | 0 | 68.1 | 0 | 0 |
| E-1 | (parts by weight) | 3.1 | 1.6 | 4.6 | 1.7 | 8.1 | 6.4 | 5.0 | 5.2 |
| G-1 | (parts by weight) | 1.5 | 4.7 | 1.5 | 1.7 | 1.6 | 2.1 | 1.7 | 1.7 |
| PW-380 | (parts by weight) | 0 | 0 | 0 | 8.3 | 14.5 | 36.1 | 0 | 0 |
| PEM 8020 | (parts by weight) | 2.4 | 2.3 | 2.5 | 2.5 | 2.7 | 3.2 | 2.5 | 2.6 |
| Irganox 1010 | (parts by weight) | 0.2 | 0.2 | 0.2 | 0.2 | 0.2 | 0.2 | 0.2 | 0.2 |
| Sumisorb 300 | (parts by weight) | 0.2 | 0.2 | 0.2 | 0.2 | 0.2 | 0.2 | 0.3 | 0.2 |
| Tinuvin 622SF | (parts by weight) | 0.3 | 0.3 | 0.3 | 0.3 | 0.4 | 0.4 | 0.3 | 0.3 |
| Hitanol 1501 | (parts by weight) | 1.6 | 0 | 1.6 | 0 | 1.8 | 0 | 0 | 0 |
| G201 | (parts by weight) | 0 | 0 | 0 | 0 | 0 | 0 | 0 | 0 |
| Hardness | | 85 | 88 | 88 | 86 | 84 | 83 | 89 | 94 |
| Elongation at break | (%) | 720 | 590 | 590 | 620 | 570 | 610 | 650 | 560 |
| Density | (g/cm$^3$) | 1.06 | 1.05 | 1.07 | 1.06 | 1.06 | 1.08 | 1.09 | 1.09 |
| Flame retardancy | | ○ | ○ | ○ | ○ | ○ | ○ | ○ | ○ |
| Mold pollution property | | 5 | 3 | 5 | 5 | 3 | 5 | 3 | 3 |
| Strand surface | | 4 | 3 | 3 | 4 | 5 | 5 | 3 | 3 |

TABLE 2

| | | Example | | | | |
|---|---|---|---|---|---|---|
| | | 9 | 10 | 11 | 12 | 13 |
| A1-1 | (% by weight) | 35.1 | 0 | 42.6 | 0 | 0 |
| A2-1 | (% by weight) | 0 | 49.1 | 0 | 0 | 0 |
| A2-2 | (% by weight) | 31.6 | 0 | 17.0 | 0 | 0 |
| B-1 | (% by weight) | 0 | 17.6 | 0 | 73.6 | 78.5 |
| C-1 | (% by weight) | 0 | 0 | 0 | 0 | 0 |
| C-2 | (% by weight) | 0 | 0 | 0 | 0 | 0 |
| C-3 | (% by weight) | 0 | 0 | 0 | 0 | 0 |
| D-1 | (parts by weight) | 0 | 0 | 0 | 0 | 0 |
| D-2 + F-1 | (parts by weight) | 0 | 0 | 0 | 0 | 0 |

TABLE 2-continued

| | | Example | | | | |
|---|---|---|---|---|---|---|
| | | 9 | 10 | 11 | 12 | 13 |
| D-3 + F-1 | (parts by weight) | 64.9 | 64.8 | 78.6 | 143.4 | 116.9 |
| E-1 | (parts by weight) | 4.9 | 4.9 | 5.9 | 11.3 | 12.3 |
| G-1 | (parts by weight) | 0.4 | 0.3 | 0.4 | 1.9 | 1.5 |
| PW-380 | (parts by weight) | 0 | 0 | 0 | 113.2 | 76.9 |
| PEM 8020 | (parts by weight) | 2.6 | 2.6 | 3.2 | 5.7 | 4.6 |
| Irganox 1010 | (parts by weight) | 0.2 | 0.2 | 0.2 | 0.4 | 0.3 |
| Sumisorb 300 | (parts by weight) | 0.2 | 0.2 | 0.2 | 0.4 | 0.3 |
| Tinuvin 622SF | (parts by weight) | 0.4 | 0.3 | 0.4 | 0.6 | 0.5 |
| Hitanol 1501 | (parts by weight) | 5.3 | 0 | 0 | 0 | 0 |
| G201 | (parts by weight) | 0 | 0 | 21.2 | 0 | 0 |
| Hardness | | 87 | 87 | 79 | 68 | 71 |
| Elongation at break | (%) | 610 | 580 | 590 | 660 | 600 |
| Density | (g/cm$^3$) | 1.10 | 1.11 | 1.11 | 1.13 | 1.13 |
| Flame retardancy | | ○ | ○ | ○ | ○ | ○ |
| Mold pollution property | | 5 | 5 | 5 | 5 | 5 |
| Strand surface | | 5 | 5 | 5 | 4 | 5 |
| Die drool | | ○ | ○ | ○ | ○ | ○ |

TABLE 3

| | | Comparative Example | | | | | | |
|---|---|---|---|---|---|---|---|---|
| | | 1 | 2 | 3 | 4 | 5 | 6 | 7 |
| A1-1 | (% by weight) | 31.8 | 32.0 | 30.4 | 65.5 | 91.8 | 32.8 | 60.0 |
| A2-1 | (% by weight) | 0 | 0 | 0 | 0 | 0 | 0 | 0 |
| A2-2 | (% by weight) | 44.4 | 44.0 | 27.2 | 0 | 0 | 0 | 0 |
| B-1 | (% by weight) | 0 | 0 | 15.2 | 0 | 0 | 67.2 | 0 |
| C-1 | (% by weight) | 0 | 0 | 0 | 34.5 | 8.2 | 0 | 40.0 |
| C-2 | (% by weight) | 23.8 | 24.0 | 27.2 | 0 | 0 | 67.2 | 0 |
| C-3 | (% by weight) | 0 | 0 | 0 | 0 | 0 | 0 | 0 |
| D-1 | (parts by weight) | 0 | 0 | 0 | 65.5 | 0 | 0 | 250.0 |
| D-2 + F-1 | (parts by weight) | 0 | 0 | 0 | 0 | 0 | 0 | 0 |
| D-3 + F-1 | (parts by weight) | 58.7 | 59.2 | 0 | 0 | 57.4 | 57.4 | 0 |
| E-1 | (parts by weight) | 6 | 0.8 | 0 | 15.5 | 4.9 | 4.9 | 5.0 |
| G-1 | (parts by weight) | 0 | 0 | 0 | 1.7 | 1.6 | 1.6 | 0 |
| PW-380 | (parts by weight) | 0 | 0 | 0 | 0 | 0 | 0 | 0 |
| PEM 8020 | (parts by weight) | 2.4 | 2.4 | 0 | 2.6 | 2.5 | 2.5 | 5.3 |
| Irganox 1010 | (parts by weight) | 0.2 | 0.2 | 0.2 | 0.2 | 0.2 | 0.2 | 0.4 |
| Sumisorb 300 | (parts by weight) | 0.2 | 0.2 | 0 | 0.2 | 0.2 | 0.2 | 0.4 |
| Tinuvin 622SF | (parts by weight) | 0.3 | 0.3 | 0 | 0.3 | 0.3 | 03 | 0.7 |
| Hitanol 1501 | (parts by weight) | 0 | 0 | 0 | 0 | 0 | 0 | 0 |
| G201 | (parts by weight) | 0 | 0 | 0 | 0 | 0 | 0 | 0 |
| Hardness | | 88 | 87 | 86 | 92 | Molding could not be performed. | >100 | Molding could not be performed |
| Elongation at break | (%) | 560 | 540 | 620 | 580 | | 140 | |
| Density | (g/cm$^3$) | 1.08 | 1.08 | 0.88 | 1.08 | | 1.08 | |
| Flame retardancy | | ○ | ○ | x | ○ | | ○ | |
| Mold pollution property | | 1 | 2 | 5 | 1 | | 5 | |
| Strand surface | | 1 | 1 | 4 | 3 | 1 | 5 | 1 |
| Die drool | | x | x | ○ | x | x | ○ | x |

What is claimed is:

1. A thermoplastic elastomer composition comprising:
   at least one selected from an ethylene copolymer comprising 55% by weight to 75% by weight of monomer units derived from ethylene and 25% by weight to 45% by weight of monomer units derived from at least one selected from the group consisting of propylene and α-olefins having 4 to 8 carbon atoms (component (A)), where the total amount of the monomer units derived from ethylene and the monomer units derived from at least one selected from the group consisting of propylene and α-olefins having 4 to 8 carbon atoms is taken as 100% by weight, and a copolymer comprising monomer units derived from a styrene and monomer units derived from a conjugate diene compound (component (B)),
   at least one selected from the group consisting of a propylene homopolymer, a propylene-ethylene random copolymer having a content of monomer units derived from propylene of 90% by weight to 99.5% by weight, where the total amount of the monomer units derived from propylene and the monomer units derived from ethylene is taken as 100% by weight, and a propylene polymeric material (component (C)),
   a phosphate and/or a polyphosphate (component (D)),
   an aromatic phosphate (component (E)), and
   a zinc oxide, magnesium oxide, calcium oxide, silicon dioxide, titanium oxide, manganese oxide, iron oxide, copper oxide, nickel oxide, tin oxide, aluminum oxide, or calcium aluminate (component (F)),
   wherein, based on 100 parts by weight in total of the component (A), the component (B) and the component (C), the content of the component (D) is 35 parts by weight to 200 parts by weight, the content of the component (E) is 0.1 parts by weight to 40 parts by weight, the content of the component (F) is 0.01 parts by weight to 15 parts by weight, the weight ratio of the total of the component (A) and the component (B) to the component (C) ((the weight of the component (A)+the weight of the component (B))/the weight of the component (C)) is from 0.7 to 10, and the weight ratio of the total of the component (D) and the component (F) to the component (E) ((the weight of the component (D)+the weight of the component (F))/the weight of the component (E)) is from 5 to 70.

2. The thermoplastic elastomer composition according to claim 1, wherein the thermoplastic elastomer composition comprises the component (A), the component (C), the component (D), the component (E), and the component (F), wherein, based on 100 parts by weight in total of the component (A) and the component (C), the weight ratio of the component (A) to the component (C) (the weight of the component (A)/the weight of the component (C)) is from 0.7 to 10.

3. The thermoplastic elastomer composition according to claim 1, further comprising a polyhydric compound (component (G)), wherein the weight ratio of the component (G) to the component (E), (the weight of the component (G)/the weight of the component (E)), is from 0.1 to 100.

4. The thermoplastic elastomer composition according to claim 2, further comprising a polyhydric compound (component (G)), wherein the weight ratio of the component (G) to the component (E), (the weight of the component (G)/the weight of the component (E)), is from 0.1 to 100.

5. A molded article made of the thermoplastic elastomer composition according to claim 1.

6. A molded article made of the thermoplastic elastomer composition according to claim 2.

7. A molded article made of the thermoplastic elastomer composition according to claim 3.

8. A molded article made of the thermoplastic elastomer composition according to claim 4.

* * * * *